US008565598B2

(12) United States Patent
Gerstel et al.

(10) Patent No.: US 8,565,598 B2
(45) Date of Patent: Oct. 22, 2013

(54) SELECTING AN OPTICAL PATH FOR A NEW CONNECTION WITH THE MINIMUM NUMBER OF OPTICAL REGENERATORS

(75) Inventors: Ornan Gerstel, Herzliya (IL); Gabriele Maria Galimberti, Bovisio Masciago (IT); Giovanni Martinelli, Lombardia (IT); Alberto Tanzi, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 609 days.

(21) Appl. No.: 12/772,537

(22) Filed: May 3, 2010

(65) Prior Publication Data

US 2011/0268439 A1 Nov. 3, 2011

(51) Int. Cl.
*H04B 10/00* (2013.01)
(52) U.S. Cl.
USPC .............................................. 398/57; 398/58
(58) Field of Classification Search
USPC ......................................................... 398/57–58
See application file for complete search history.

(56) References Cited

U.S. PATENT DOCUMENTS

| 2003/0035166 | A1 | 2/2003 | Zhang et al. | |
|---|---|---|---|---|
| 2004/0220886 | A1* | 11/2004 | Kumaran et al. | 705/400 |
| 2005/0169196 | A1 | 8/2005 | Carpenter et al. | |

FOREIGN PATENT DOCUMENTS

WO 2006048414 A1 5/2006

OTHER PUBLICATIONS

International Search Report and Written Opinion in counterpart International Application No. PCT/US2011/034250, mailed Aug. 24, 2011.
Bernd Nebendahl et al., Agilent Metrology of Advanced Optical Modulation Formats, White Paper, Agilent Technologies, Inc., Apr. 29, 2009.
Nicola Sambo et al., Distributing Shared Regenerator Information in GMPLS-Controlled Translucent Networks, IEEE communications letters, vol. 12, No. 6, Jun. 2008.

* cited by examiner

*Primary Examiner* — Danny Leung
(74) *Attorney, Agent, or Firm* — Edell, Shapiro & Finnan, LLC (57) ABSTRACT

Techniques are provided for receiving a connection request at a first network node configured to request a connection from the first network node to a second network node. At the first network node, it is determined if a path to the second network node without an optical regenerator is available for the connection. In response to determining that a path without an optical regenerator is not available, a path to the second network node is determined that has a minimum number of optical regenerators. The connection is set up using the path with the minimum number of optical regenerators.

20 Claims, 8 Drawing Sheets

A connection request is received for a connection from node A to node C

Reachability map for Node A with regeneration required

——— Original link

——— Added reachability for Node A with regeneration

| Determine a path segment to an optical regenerator, reserve the path segment to the optical regenerator, and specify any remaining optical regenerators in the selected path to a node associated with the optical regenerator so the node associated with the optical regenerator can reserve a path to a next specified optical regenerator, each path to an optical regenerator or the second network node forming a segment | — 432 |

| Determine any remaining segments between the optical regenerator and the second network node | — 434 |

| Determine another path to the second network node if any path segments to the second network node are not optically viable | — 436 |

SELECTING AN OPTICAL PATH FOR A NEW CONNECTION WITH THE MINIMUM NUMBER OF OPTICAL REGENERATORS

BACKGROUND

When routing optical connections in large scale Dense Wavelength Division Multiplexed (DWDM) networks, the optical signals may be optically regenerated to overcome losses due to attenuation and distortion induced by long-haul fibers. Optical regenerators receive an incoming optical signal at an optical wavelength, convert the optical signal to an electrical signal, process the electrical signal, and then retransmit the processed signal (after it is converted back to an optical signal) at an outgoing optical wavelength. Thus, optical regenerators act as optical-electrical-optical (OEO) repeaters.

Due to the high data rates that are carried on DWDM networks, high speed electronics are needed for the OEO conversion performed in an optical regenerator. The high speed electronics are expensive and consequently make optical regenerators the most expensive component along the communications path. Therefore, their use should be minimized. Since such regenerators are not necessarily on the shortest physical path between the endpoints, the nodes need to consider all feasible paths in the network to find one that minimizes regenerator usage. As a result, approaches based on considering a predetermined number of shortest paths during the connection signaling phase will not necessarily minimize regenerator usage.

DESCRIPTION OF EXAMPLE EMBODIMENTS

Overview

Techniques are provided herein for receiving a connection request at a first network node configured to request a connection to a second network node. At the first network node, one or more optical paths are determined from the first network node to the second network node. A path to the second network node is selected from the one or more optical paths based on one or more path selection criteria that includes one or more paths that are determined to have a minimum number of optical regenerators. The connection is set up using the selected path.

Example Embodiments

Figure 1:
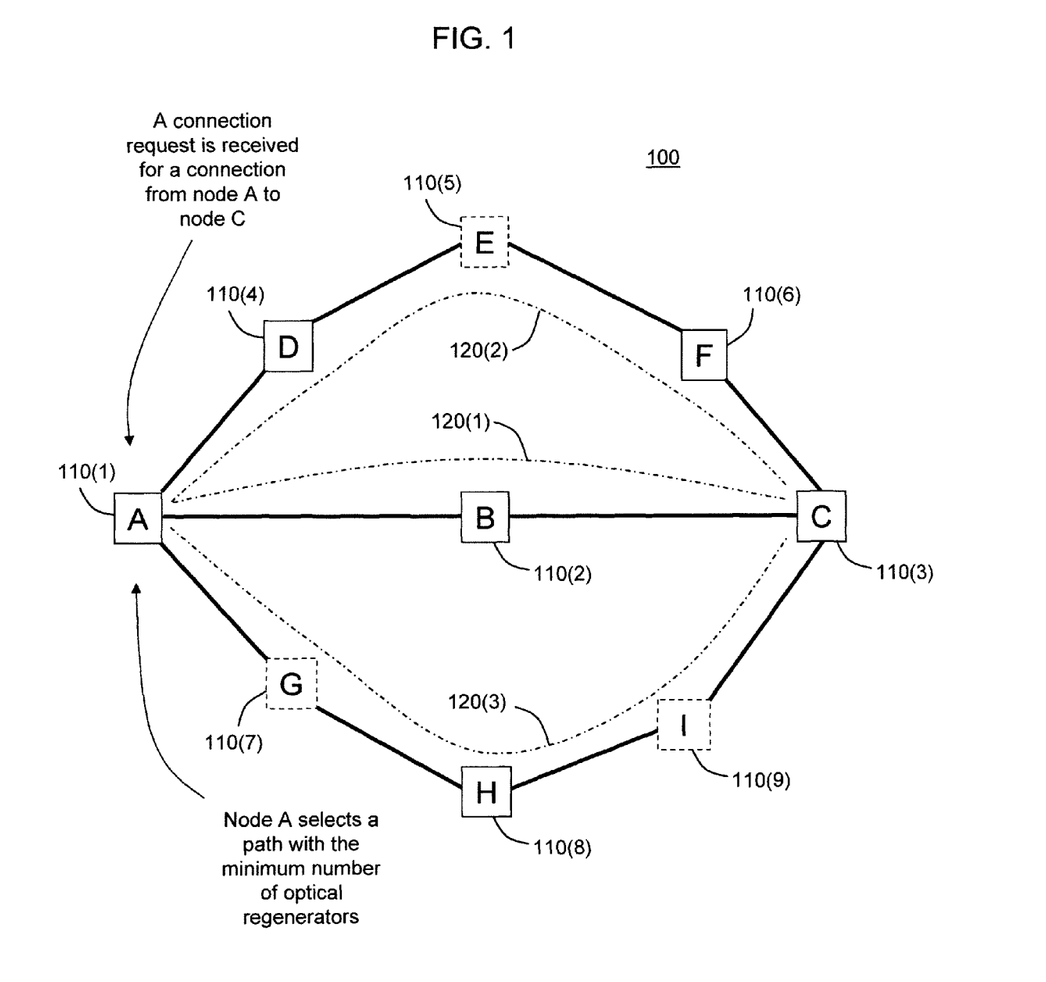
FIG. 1 is block diagram showing an example of an optical network with a plurality of nodes, wherein nodes are configured to select an optical path with the minimum number of optical regenerators.

Referring first to FIG. 1, an optical network 100 is shown with nodes A-I labeled with reference numerals 110(1)-110(9), respectively. The nodes A-I may be optical nodes that contain routers, add-drop multiplexers, transponders, and the like. Nodes E, G, and I contain optical regenerators as indicated by the dashed lines for these nodes. One or more of the nodes A-I are configured to select a path to another node with a minimum number of optical regenerators in response to a request for a connection from one node to another node. A process by which a node selects the path with a minimum number of optical regenerators is described hereinafter in connection with FIGS. 3-8. For example, as shown in FIG. 1, a request is received at node A for a connection from node A to node C as shown. Node A performs a process to select the path to node C with the minimum number of optical regenerators.

Each node that is configured to perform the process described herein is aware of the location and capabilities of optical regenerators in the network 100, and attempts to coordinate a path from to another node that has the minimum number of optical regenerators. In the example network topology shown in FIG. 1, there are three possible connection paths 120(1), 120(2), and 120(3) between node A and node C. Path 120(1) shows a possible path from node A to node B and from node B to node C, denoted A-B-C, and this path has zero optical regenerators. Path 120(2), denoted A-D-E-F-C, has one optical regenerator at node E, and path 120(3), denoted A-G-H-I-C, has two optical regenerators at nodes G and I. For ease of explanation it is assumed that signals passing through nodes with optical regenerators require optical regeneration, which may not be the case in actual DWDM networks.

Generally, to minimize the use of optical regenerator resources, node A first determines that the path with the minimum number of optical regenerators is path 120(1), which has zero optical regenerators. Node A works with other control plane resources to determine if a connection is available over path 120(1). If a connection is not available over path 120(1), e.g., if no wavelengths are available, then node A determines whether a connection is available over path 120(2), which has one optical regenerator. If a connection is not available over path 120(2), then node A determines whether a connection is available over path 120(3), which has two optical regenerators. This generally explains how a node is configured to determine the path with the minimum number of optical regenerators. Further details of this process are described hereinafter in connection with FIGS. 3-8.

Figure 2:
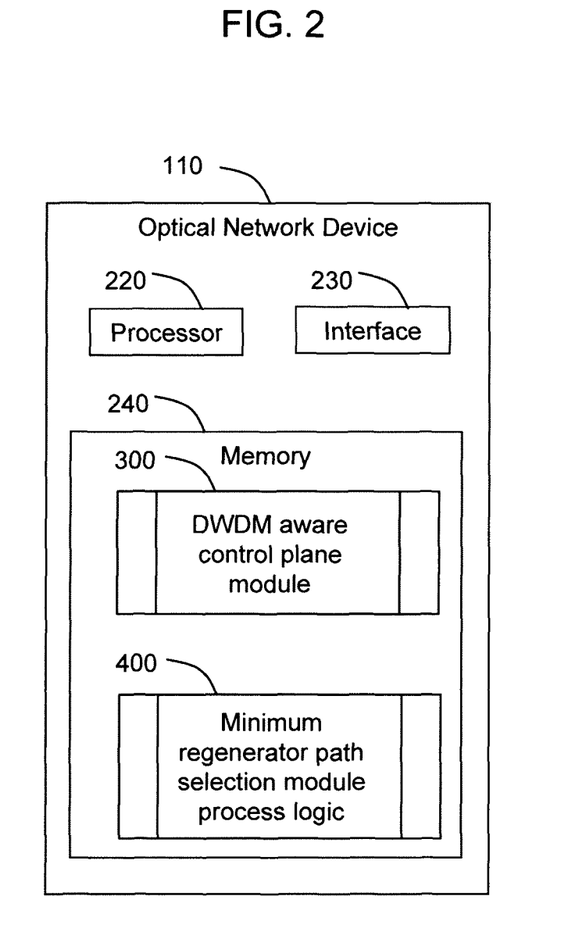
FIG. 2 is an example of a block diagram of an optical communication device that is configured to determine a path for a new connection request that uses a minimum number of optical regenerators.

Referring now to FIG. 2, an example of a block diagram is shown for an optical network device that may serve as network node generally identified at reference numeral 110, such as node A shown in FIG. 1. The node 110 comprises a processor 220, a network interface unit 230, and a memory 240. The network interface unit 230 enables communication between the node A and other network elements in the network 100, for both electrical (for control plane communications) and optical communication (for optical traffic) with other nodes. The memory 240 stores instructions for DWDM aware control plane process logic 300 and also instructions for minimum regenerator path selection process logic 400. The DWDM aware control plane process logic 300 allows the node 110 to communicate on the control plane with other nodes and to be aware of optical impairments and wavelength availability within network 100. In addition, the DWDM aware control plane process logic 300 generally tries to find the shortest photonically feasible or viable path for new connections. However, when the shortest path is not available the DWDM aware control plane process logic 300 and minimum regenerator path selection process logic 400 work together to determine an available connection when a path with optical regeneration is needed.

The processor 220 is a data processing device, e.g., a microprocessor, microcontroller, systems-on-a-chip (SOCs), or other fixed or programmable logic. The processor 220 interfaces with the memory 240 that may be any form of random access memory (RAM) or other data storage block that stores data and software instructions used for the techniques described herein. The memory 240 may be separate or part of the processor 220. Instructions for performing the minimum regenerator path selection process logic 400 may be stored in the memory 240 for execution by the processor 220. In general, the minimum regenerator path selection process logic 400 coordinates with the DWDM aware control plane process logic 300 to set up a connection with the minimum number of optical regenerators. It is to be understood that the functions of DWDM aware control plane process logic 300 and minimum regenerator path selection process logic 400 may be distributed throughout network 100, e.g., in the various nodes, and that DWDM aware control plane process logic 300 and minimum regenerator path selection process logic 400, i.e., they could be part of a single software, firmware, hardware application, or in combinations thereof.

The functions of the processor 220 may be implemented by a processor readable tangible medium encoded with instructions or by logic encoded in one or more tangible media (e.g., embedded logic such as an application specific integrated circuit (ASIC), digital signal processor (DSP) instructions, software that is executed by a processor, etc.), wherein the memory 240 stores data used for the computations or functions described herein (and/or to store software or processor instructions that are executed to carry out the computations or functions described herein). Thus, the minimum regenerator path selection process logic 400 may be implemented with fixed logic or programmable logic (e.g., software/computer instructions executed by a processor or field programmable gate array (FPGA)), or the processor readable tangible medium may be encoded with instructions that, when executed by a processor, cause the processor to execute operations for the minimum regenerator path selection process logic 400 as described herein.

Figure 3:
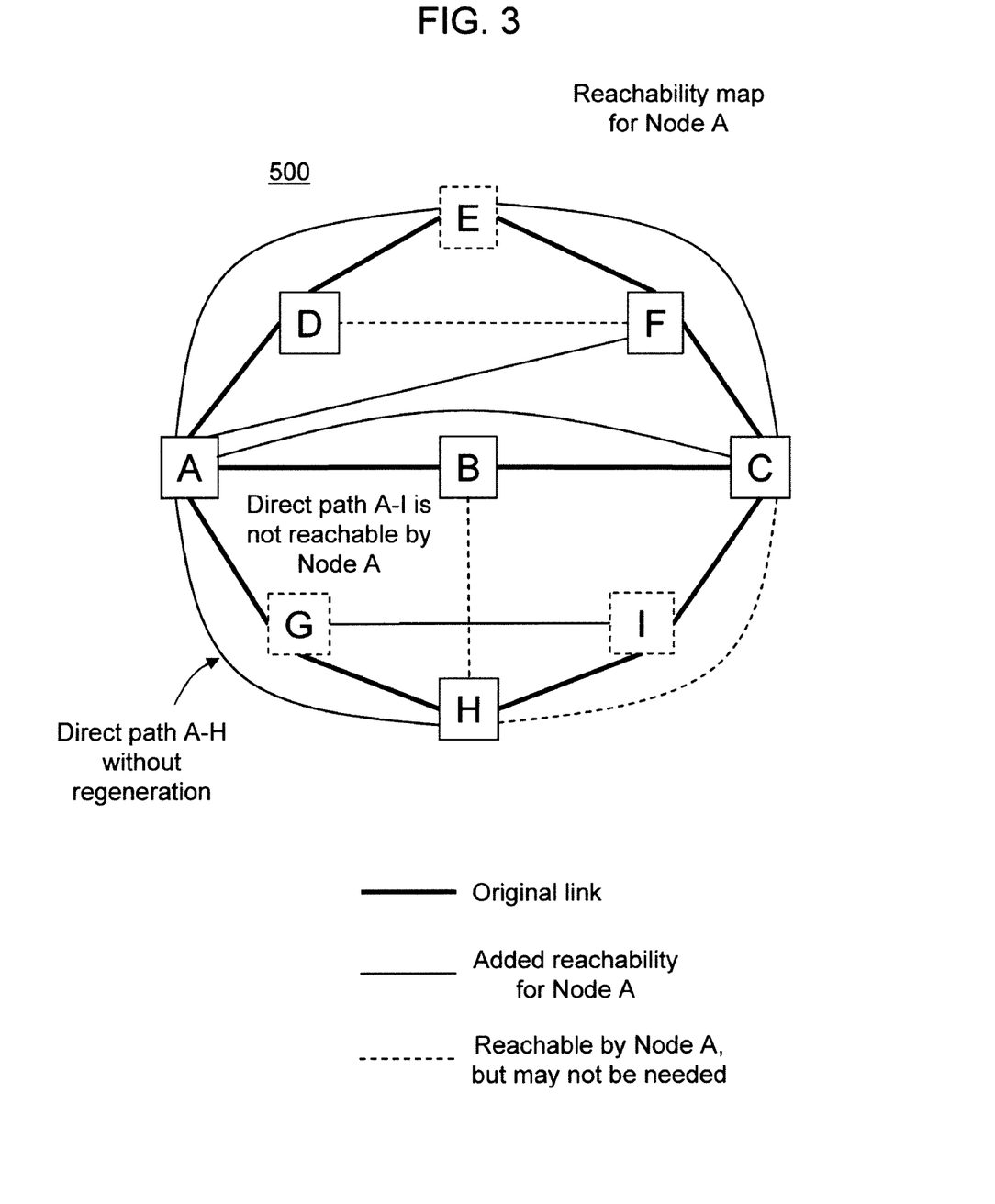
FIG. 3 is a block diagram showing an example of a network map that depicts which nodes are optically reachable by a single node.

Referring next to FIG. 3, a block diagram showing an example of a network map 500 that depicts which nodes are optically reachable by a node, e.g., node A in the example network topology of FIG. 1. Thus, the diagram shown in FIG. 3 represents a reachability map for node A. Map 500 represents a graph of all of the nodes in a network and the paths between them that are reachable from a photonics impairment perspective. The map comprises the shortest hop paths in a real network that have a high probability for a successful connection for path segments without optical regenerators, including path segments to connection endpoints. The map also contains the locations of the optical regenerators in the network, and the capabilities and availability thereof, such that a path with the minimum number of optical regenerators can be determined. In other words, the reachability map contains node pairs for path segments that are optically reachable along the path between the endpoints, and the locations and availability of optical regenerators.

In FIG. 3, map 500 shows the original communications links in network 100 as thick or heavier weighted lines. Additional links that are available to node A are shown as thin or lighter weight lines. Links that may be omitted from the map are shown as dashed lines. For example, a direct path A-H is available that bypasses optical regenerators in node G. The map 500 also shows more direct connections, i.e., connections that bypass a node, e.g., possible connections A-E-C, A-F, or A-C, but no direct connection is available from node A to node I (A-I). Any connection may not be available due to equipment limitations or optical environmental conditions.

Example optical environmental conditions that may limit connectivity include linear effects such as attenuation and chromatic dispersion, non-linear effects like phase modulation and scattering, or a cut fiber. Example equipment limitations include a lack of an interface at the desired wavelength, modulation scheme, bit rate, or the available interfaces are otherwise deficient with respect to parameters necessary to set up a connection. Accordingly, information representing the map 500 may be based on available interface parameters. For example, maps may be generated based on 10, 40, or 100 Gigabit bit rates, various optical lines codes or phase-shift keying optical formats, the available wavelengths, and/or other connection parameters. A single map may be generated for the network or multiple maps may be generated for each different interface type.

Figure 4:
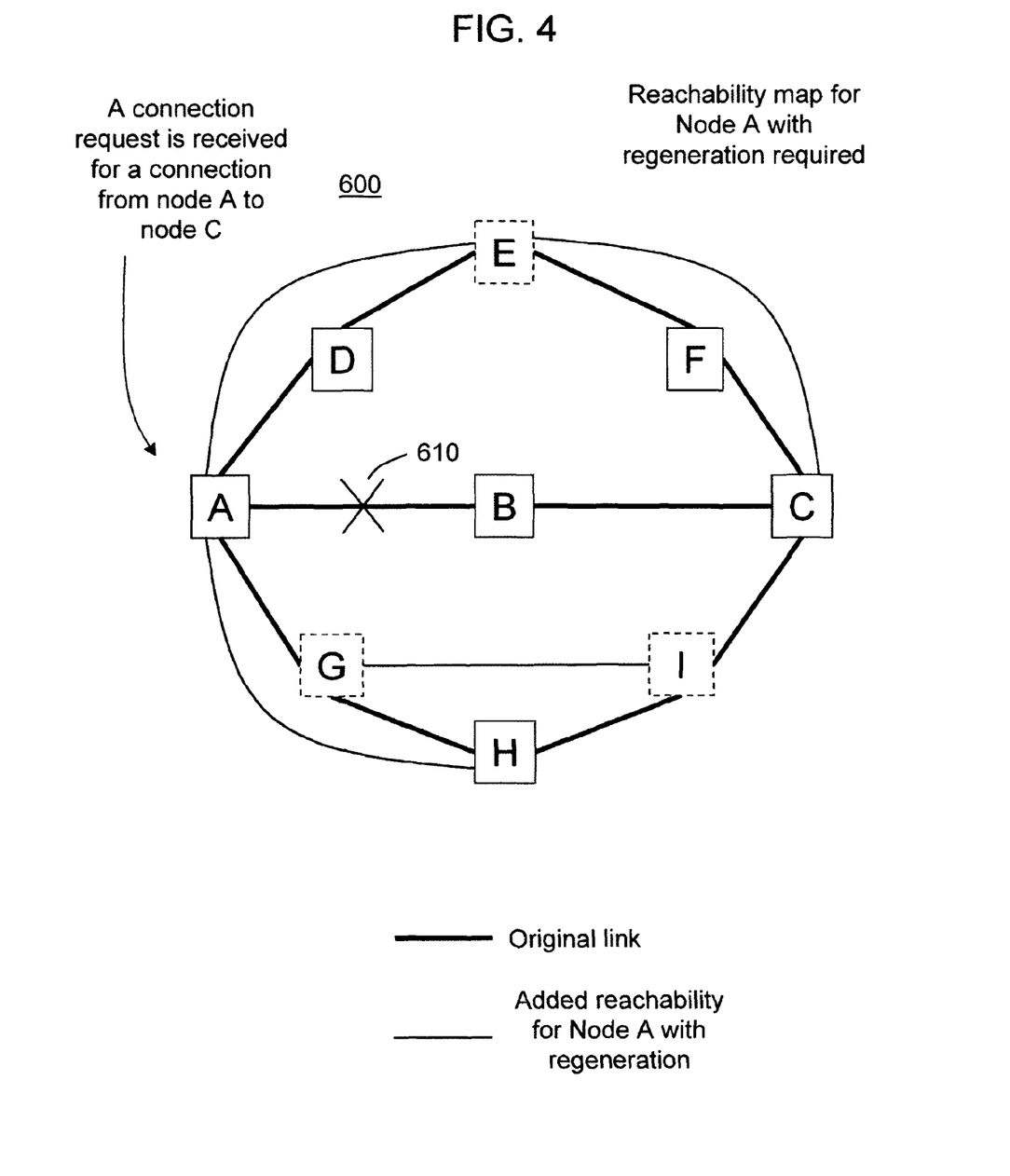
FIG. 4 is a block diagram showing an example of a network map that depicts which nodes are optically reachable by a single node when it is determined that a path without an optical regenerator is not available for a new connection.

Turning to FIG. 4, another reachability map 600 for node A is shown. A request is received for a connection from node A to node C as shown. The map 600 shows that the shortest connection with the least number of optical regenerators is A-B-C. The minimum regenerator path selection process logic in node A would determine path A-B-C to be the path of choice. However, at this point in time node A is aware via the DWDM control plane, that the path A-B is not available as shown at 610. The connection may not be available for any of the reasons described above or other reasons. Node A would then determine the next shortest hop path to be A-E-C, which bypasses nodes D and F. Should the path A-E become unavailable for any reason then Node A may determine the next shortest hop path to be A-D-E-C.

Once the path is selected, e.g., path A-E-C, the optical regenerator interface needed for the connection is reserved in node E using control signaling, e.g., performed by the DWDM aware control plane process logic. Once the optical regenerator is reserved, the photonic paths for each segment between optical regenerators, and each segment between optical regenerators and connection endpoints are set up, e.g., the requested connection is set up for segments A-E and E-C. As shown in map 600, path A-G-I-C is also available, but because this path would use optical regenerator resources in two nodes, i.e., nodes G and I, they are not selected as long as a path through node E is available. When the connection between node A and node C is terminated, the connection is torn down and the optical regenerator used for the connection in node E is released.

Figure 5:
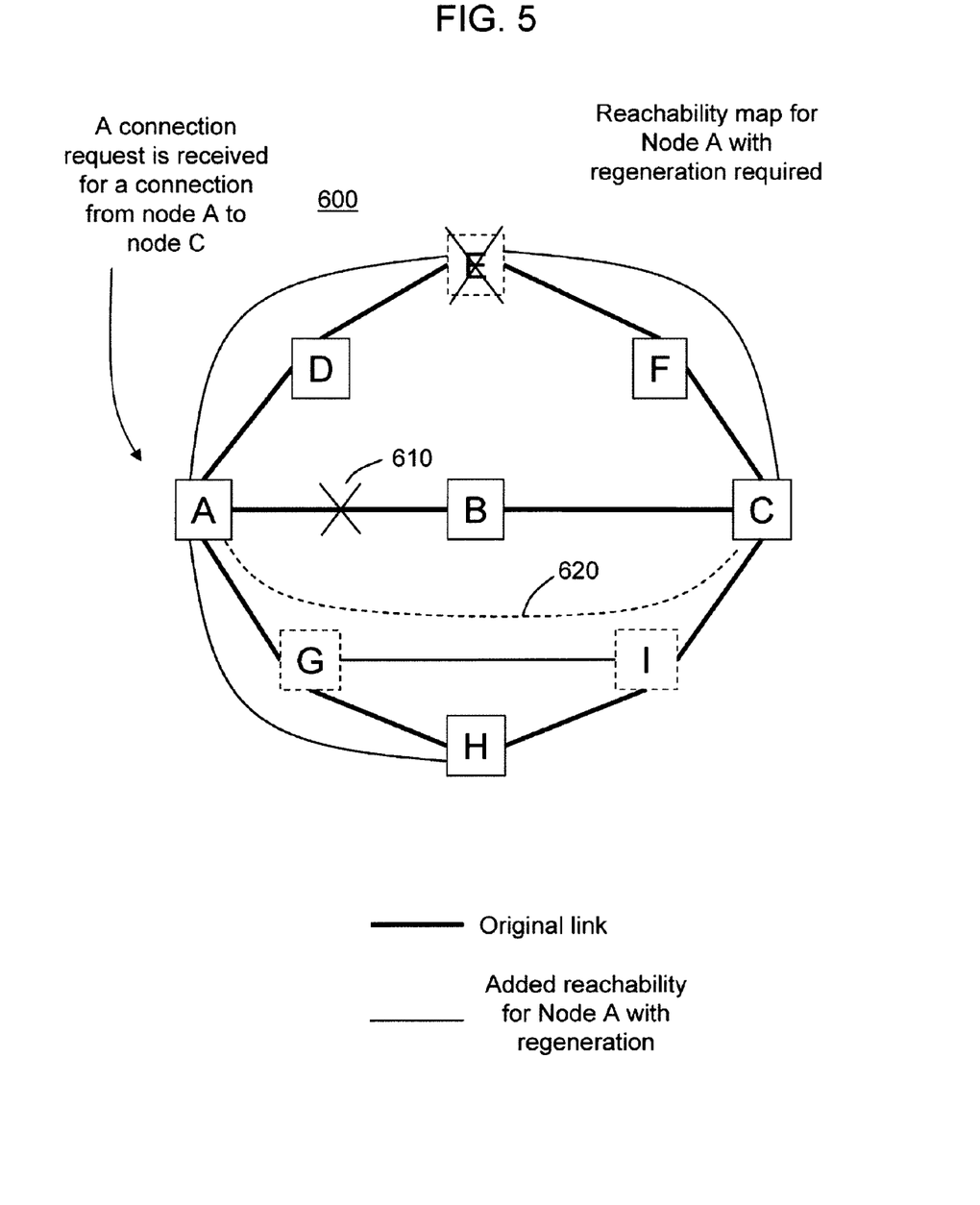
FIG. 5 is a block diagram showing an example of a network map from FIG. 4 in which an additional node is determined to be not optically reachable.

Referring to FIG. 5, the reachability map 600 from FIG. 4 is shown with node E being unreachable by node A. A request is received for a connection from node A to node C as shown. The map shows that in this scenario path 620 (A-G-I-C) is available that consumes optical regenerator resources in nodes G and I as mentioned above.

As shown in the various reachability maps more than one path may be available for a connection from A to C. However, in some cases the shortest hop path may not be the best path from a photonics perspective and Node A may want to choose another path. In one example, weights or metrics may be assigned to each link or segment of a path, and stored in the reachability map. The weights are a measure of the feasibility of each link or segment, or the reachability of each node.

Node A, in executing the minimum regenerator path selection process logic may select a path based on the weights stored in the reachability map, e.g., path A-G-I-C. Once the path A-G-I-C is selected, node A reserves the optical regenerators in nodes G and I. Then, node A sets up the connection from node A to node C using path segments A-G, G-I, and I-C assuming those path segments are optically feasible at the time the connection is set up.

As described above, FIGS. 3-5 show reachability maps that depict various scenarios that may be encountered when a new connection request is received at node A. In each scenario the minimum regenerator path selection process logic 400 determines a path based on one or more paths determined to have a minimum number of optical regenerators. When DWDM aware control plane process logic 300 determines that a selected path is not available, the minimum regenerator path selection process logic 400 selects a new path. In this respect, finding a path with the minimum number of optical regenerators may be an iterative process.

Figure 6:
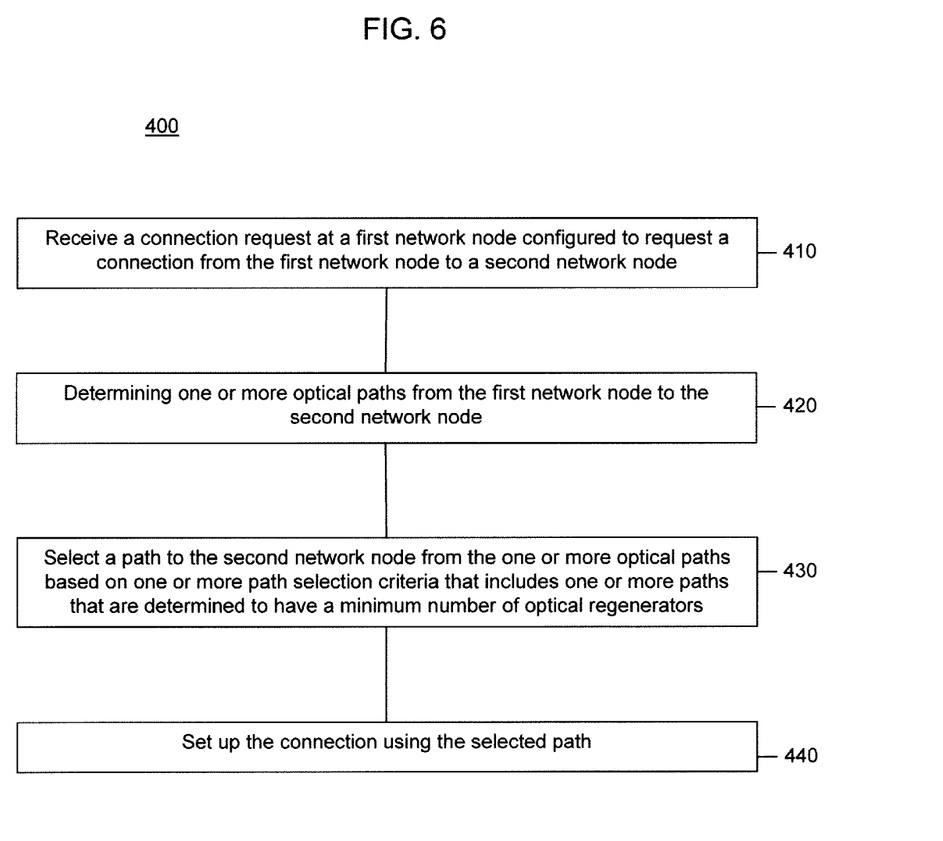
FIG. 6 is a flowchart generally depicting a process for selecting a path with a minimum number of optical regenerators for a new connection request.

Referring now to FIG. 6, a flowchart generally depicting operations of the minimum regenerator path selection process logic 400 is now described. Again, the minimum regenerator path selection process logic 400 is configured to allow a first node to select a path to a second node based on one or more paths determined to have a minimum number of optical regenerators for a new connection request. At 410, a connection request is received at a first network node that is configured to request a connection to a second network node. At 420, at the first network node, one or more optical paths are determined from the first network node to the second network node. At 430, a path to the second network node is selected from the one or more optical paths based on one or more path selection criteria that includes one or more paths that are determined to have a minimum number of optical regenerators. At 440, the connection is set up using the selected path. Although an objective is to find a path with the path with the minimum number of optical regenerators, it is to be understood that the path with the minimum number of regenerators may not be the one that is ultimately selected for the reasons described herein.

Figure 7:
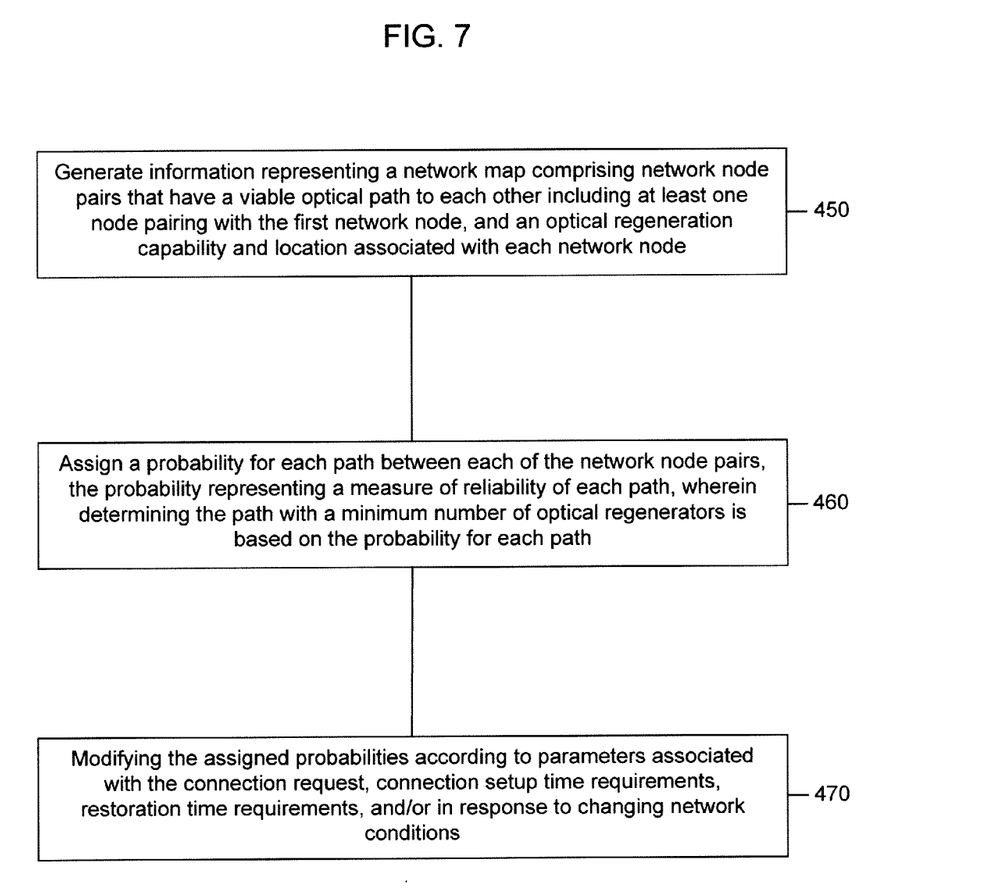
FIGS. 7 and 8 are flowcharts generally depicting additional operations for the process shown in FIG. 6.

The minimum regenerator path selection process logic 400 can be further enhanced through the use of a reachability map as described above. Referring to FIG. 7, at 450, information (data) is generated that represents a network map comprising network node pairs that have a viable optical path to each other including at least one node pair including the first network node, and an optical regeneration capability and location associated with each network node. At 460, a weight is assigned for each path between each of the network node pairs, the weight representing a measure of reliability of each path. The path with a minimum number of optical regenerators is determined based on the weight for each path.

Reachability maps may be generated using a planning tool and downloaded to the various nodes, generated dynamically using signaling or routing via a control plane mechanism (each of the network nodes along the path between the endpoint nodes), or both. Initial weights may be set using the planning tool based on known network properties. The weights may be subsequently updated in response to changing network conditions such as when the network expands or changes, optical environmental conditions change, as wavelengths become blocked or unblocked, or as optical regenerators are reserved or released. The weights may also reflect current failures and failure histories, and may be adjusted, e.g., using a time or history based function such as an exponential decay function.

At 470, the assigned weights or metrics are modified according to parameters associated with the connection request, connection setup time requirements, restoration time requirements, and/or in response to changing network conditions. For example, the weights may be adjusted based on parameters associated with the connection request such as connection priority, or connection setup time requirements or restoration time requirements. In another example, the weights could be set aggressively or optimistically. This would allow the network to find a path that uses fewer optical regenerators at the risk of discovering that one or more segments is not viable, which would thereby increase signaling overhead and increase connection setup time. Alternatively, the weights could be set conservatively or pessimistically. This would allow the network to find a path that uses a greater number optical regenerators because marginal paths will not be considered, thereby reducing signaling overhead and reducing connection setup time, which may be desirable for path protection. In essence, the assigned weights end up to be highly correlated to a probability that any given segment of any given path will be selected.

Figure 8:
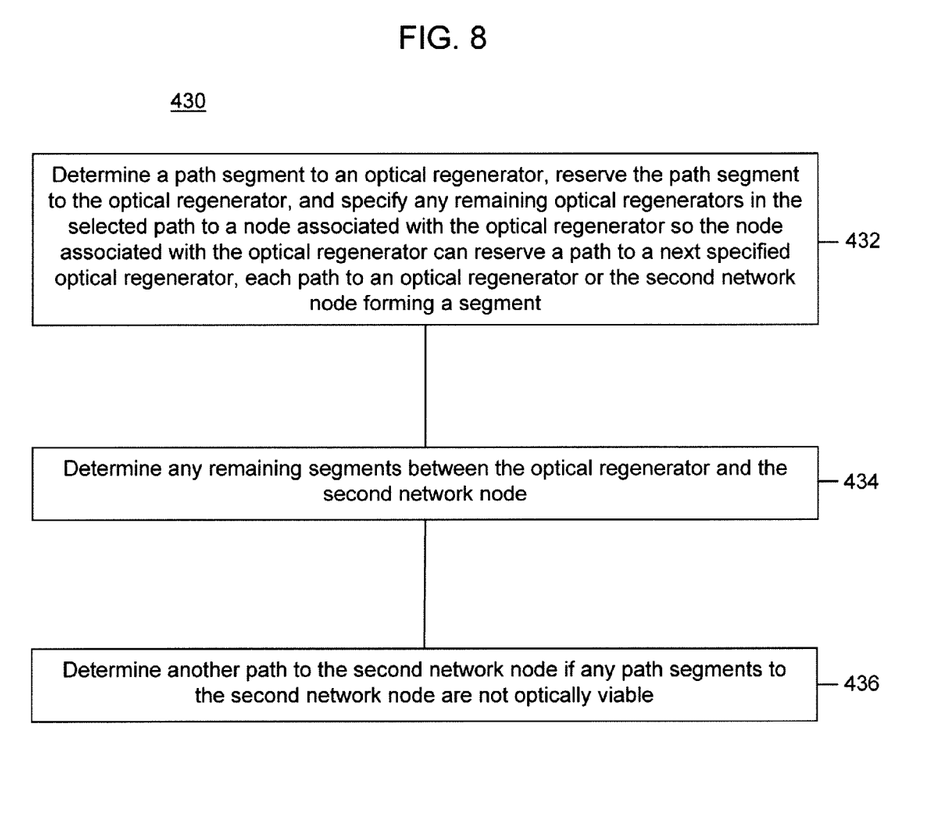

FIG. 8 is a flowchart that depicts additional operations for operation 430 shown in FIG. 6. At 432, a path segment to an optical regenerator is determined. The path segment to the optical regenerator is reserved and any remaining optical regenerators in the selected path to a node associated with the optical regenerator are specified, thereby enabling the node associated with the optical regenerator to reserve a path to a next specified optical regenerator. Each path to an optical regenerator or to the second network node forms a segment. At 434, any remaining path segments between the optical regenerator and the second network node are determined. At 436, another path to the second network node is determined if any path segments of the path to the second network node are not optically viable optical. As a result, a connection is set up between endpoints using the minimum number of optical regenerators.

Techniques are described herein for receiving a connection request at a first network node configured to request a connection from the first network node to a second network node. At the first network node, it is determined if a path to the second network node without an optical regenerator is available for the connection. In response to determining that a path without an optical regenerator is not available, a path to the second network node is determined that has a minimum number of optical regenerators. The connection is set up using the path with the minimum number of optical regenerators.

The above description is intended by way of example only.

What is claimed is:

1. A method comprising:
   receiving a connection request for a connection from a first network node to a second network node;
   determining one or more optical paths from the first network node to the second network node;
   generating information representing a network map comprising network node pairs that have a viable optical path to each other including at least one node pair that includes the first network node, and an optical regeneration capability and location associated with each network node;
   determining, for each network node with one or more optical regenerators, optical interface parameters including supported connection speeds, modulation types, and available wavelengths for the one or more optical regenerators;
   determining optical viability of a path from the optical interface parameters; and selecting a path to the second network node from the one or more optical paths based on one or more path selection criteria that includes one or more paths that are determined to have a minimum number of optical regenerators and the optical interface parameters of any optical regenerators in the path.

2. The method of claim 1, further comprising assigning a metric for each path between each of the network node pairs, the metric representing a measure of reliability of each path, wherein selecting the path with a minimum number of optical regenerators is based on the metric for each path.

3. The method of claim 2, further comprising modifying the assigned metrics according to parameters associated with the connection request, connection setup time requirements, restoration time requirements, and/or in response to changing network conditions.

4. The method of claim 1, wherein generating comprises generating different sets of information representing a plurality of network maps based on the optical interface parameters.

5. The method of claim 1, wherein generating comprises generating the information representing the network map based on a planning tool and downloading the information representing the network map to the first network node.

6. The method of claim 1, wherein generating comprises generating the information representing the network map dynamically at the first network node by signaling each of the network nodes along the path to the second network node.

7. The method of claim 1, further comprising setting up the connection using the selected path, wherein setting up the connection comprises determining a path segment to an optical regenerator, reserving the path segment to the optical regenerator, and specifying any remaining optical regenerators in the selected path to a node associated with the optical regenerator to enable the node associated with the optical regenerator to reserve a path segment to a next specified optical regenerator.

8. The method of claim 7, further comprising determining any remaining path segments between the optical regenerator and the second network node.

9. The method of claim 8, wherein determining the path comprises determining another path to the second network node if any path segments of the path to the second network node are not optically viable.

10. An apparatus comprising:
an interface unit configured to enable communication over a network; and
a processor configured to:
receive a connection request for a connection to from a first network node to a second network node;
determine one or more optical paths from the first network node to the second network node;
generate information representing a network map comprising network node pairs that have a viable optical path to each other including at least one node pair that includes the first network node, and an optical regeneration capability and location associated with each network node;
determine, for each network node with one or more optical regenerators, optical interface parameters including supported connection speeds, modulation types, and available wavelengths for the one or more optical regenerators;
determine optical viability of a path using the optical interface parameters; and
select a path to the second network node from the one or more optical paths based on one or more path selection criteria that includes one or more paths that are determined to have a minimum number of optical regenerators and the optical interface parameters of any optical regenerators in the path.

11. The apparatus of claim 10, wherein the processor is further configured to assign a metric for each path between each of the network node pairs, the metric representing a measure of reliability of each path, wherein determining the path with a minimum number of optical regenerators is based on the metric for each path.

12. The apparatus of claim 11, wherein the processor is further configured to modify the assigned metrics according to parameters associated with the connection request, connection setup time requirements, restoration time requirements, and/or in response to changing network conditions.

13. The apparatus of claim 10, wherein the processor is further configured to:
set up the connection using the selected path;
determine a path segment to an optical regenerator;
reserve the path segment to the optical regenerator; and
specify any remaining optical regenerators in the path segment to a node associated with the optical regenerator to enable the node associated with the optical regenerator to reserve a path segment to a next specified optical regenerator.

14. A processor readable medium storing instructions that, when executed by a processor, cause the processor to:
receive a connection request for a connection from a first network node to a second network node;
determine one or more optical paths from the first network node to the second network node;
generate information representing a network map comprising network node pairs that have a viable optical path to each other including at least one node pair that includes the first network node, and an optical regeneration capability and location associated with each network node;
determine, for each network node with one or more optical regenerators, optical interface parameters including supported connection speeds, modulation types, and available wavelengths for the one or more optical regenerators;
determine optical viability of a path using the optical interface parameters; and
select a path to the second network node from the one or more optical paths based on one or more path selection criteria that includes one or more paths that are determined to have a minimum number of optical regenerators and the optical interface parameters of any optical regenerators in the path.

15. The processor readable medium of claim 14, and further comprising instructions that, when executed by a processor, cause the processor to assign a metric for each path between each of the network node pairs, the metric representing a measure of reliability of each path, wherein determining the path with a minimum number of optical regenerators is based on the metric for each path.

16. The processor readable medium of claim 15, and further comprising instructions that, when executed by a processor, cause the processor to modify the assigned metrics according to parameters associated with the connection request, connection setup time requirements, restoration time requirements, and/or in response to changing network conditions.

17. The processor readable medium of claim 14, wherein the instructions that cause the processor to generate comprise instructions that cause the processor to generate the information representing the network map dynamically at the first network node by signaling each of the network nodes along the path to the second network node.

18. The processor readable medium of claim 14, further comprising instructions that, when executed by a processor, cause the processor to:
   set up the connection using the selected path;
   determine a path segment to an optical regenerator;
   reserve the path segment to the optical regenerator; and
   specify any remaining optical regenerators in the path segment to a node associated with the optical regenerator to enable the node associated with the optical regenerator to reserve a path segment to a next specified optical regenerator.

19. The processor readable medium of claim 14, wherein the instruction that cause the processor to generate comprise instructions that cause the processor to generate different sets of information representing a plurality of network maps based on the optical interface parameters.

20. The apparatus of claim 10, wherein the processor is configured to generate different sets of information representing a plurality of network maps based on the optical interface parameters.

\* \* \* \* \*